United States Patent [19]
Allard et al.

[11] Patent Number: 6,018,619
[45] Date of Patent: *Jan. 25, 2000

[54] METHOD, SYSTEM AND APPARATUS FOR CLIENT-SIDE USAGE TRACKING OF INFORMATION SERVER SYSTEMS

[75] Inventors: James E. Allard, Seattle; David R. Treadwell, III, Woodenville; John F. Ludeman, Redmond, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,976

[22] Filed: May 24, 1996

[51] Int. Cl.$^7$ ........................................... G06F 13/00
[52] U.S. Cl. ................................ 395/200.54; 395/200.45; 395/200.46; 395/200.59; 395/200.41
[58] Field of Search .......................... 395/200.11, 200.05, 395/200.09, 200.15, 200, 200.53, 200.54, 200.38, 200.45, 200.49, 200.46, 200.57, 200.59, 200.41, 200.43

[56] References Cited

U.S. PATENT DOCUMENTS

| | | | |
|---|---|---|---|
| 5,032,979 | 7/1991 | Hecht et al. | 395/187.01 |
| 5,517,519 | 5/1996 | Carbone, Jr. et al. | 375/211 |
| 5,579,222 | 11/1996 | Baines et al. | 395/712 |
| 5,590,245 | 12/1996 | Leamy et al. | 395/118 |
| 5,614,940 | 3/1997 | Cobbley et al. | 348/7 |
| 5,619,656 | 4/1997 | Graf | 395/200.11 |
| 5,627,886 | 5/1997 | Bowman | 379/111 |
| 5,678,041 | 10/1997 | Baker et al. | 395/609 |
| 5,696,965 | 12/1997 | Dedrick | 395/610 |
| 5,706,507 | 1/1998 | Schloss | 395/615 |
| 5,727,159 | 3/1998 | Kikinis | 395/200.76 |
| 5,796,952 | 8/1998 | Davis et al. | 395/200.54 |

*Primary Examiner*—Meng-Ai T. An
*Assistant Examiner*—Gautam R. Patel
*Attorney, Agent, or Firm*—Workman, Nydegger, Seeley

[57] ABSTRACT

A method for tracking usage patterns of users of hypermedia systems, such as the World-Wide Web, that creates a usage log on a user's client computer and periodically transmits the usage log from the user's client machine to a usage tracking server computer to be incorporated in an overall usage log for a given information server computer. Alternatively, proxy server may be connected between a client computer and an information server with the proxy server acting as a client to the information server and creating a usage log of the user's client computer access to the information server computer to be sent to usage tracking computer. Each time a user connects to a Web site, the client computer or proxy server creates a usage log that records all objects retrieved from that particular Web site and other attributes of user processing such as time spent viewing an object, amount of an object viewed, etc. Periodically, upon the occurrence of one of more predefined events that signify the end of a session, computer or proxy server saves the usage log into a single, compressed file and transmits the resulting file to the server. Events that signify the end of a session and trigger the transmission of a usage log from the user's client computer or proxy server computer to the usage tracking server computer may include a predetermined time interval, accessing a predetermined number of objects, application program or operating system shut down, connecting to a different Web site, and/or modem shut down.

27 Claims, 6 Drawing Sheets

METHOD, SYSTEM AND APPARATUS FOR CLIENT-SIDE USAGE TRACKING OF INFORMATION SERVER SYSTEMS

BACKGROUND OF THE INVENTION

1. The Field of the Invention

The field of this invention is in the area of usage tracking systems, methods, and apparatuses for computer servers and the like. More specifically, the invention is directed to usage tracking systems, methods, and apparatuses for tracking user activity on information servers, more particularly information servers in hyper-media systems such as the World-Wide Web ("WWW"). The invention also relates to client-side usage tracking servers for computers connected by a communications network according to the client-server model.

2. Present State of the Art

The proliferation of communication networks has provided substantial opportunity for easy access to a wealth of information from a variety of sources. Many times, such information is made available on a server computer that can be accessed through use of a communications network by one or more remote client computers using the appropriate conventions and protocols. For example, a user may dial up a bulletin board by means of a modem in order to access the information contained at the bulletin board site. Also, the Internet provides large scale access of many differing kinds of information by a variety of clients.

Particularly important in this field of technology are hyper-media systems such as the World-Wide Web. Because a user may quickly or easily transition between desired objects, usually by means of a graphical user interface, the "Web" and other systems have show great promise in reaching a large percentage of an ever growing potential audience. A hyper-media system is easily traversed by the user operating a graphical user interface ("GUI"). A user can select with a mouse or other pointing device certain icons or areas on the screen that will access a different link at that particular web site or to an entirely different Web site, which may be physically located anywhere in the world.

The World-Wide Web is based upon the Hyper Text Transfer Protocol ("HTTP"), which allows a user to quickly and easily access any number of servers attached to the Internet and to quickly and easily jump from one location to another. The locations may be on the same information server that a user is currently "visiting" or may be an information server located half way around the world. This "Web" of information servers represents a vast store of easily accessible information.

Typically, a user will access a particular object, often a hypertext document (though audio files, video clips, and other object types exist and are popular), from an information server to be processed or interpreted at the client computer running a "Browser." A hypertext document is an ASCII file having text and coded information according to the Hyper Text Markup Language ("HTML") definition. The HTML codes within the hypertext document object will be interpreted by a client browser to format the textual characters in a pleasing manner on the browser screen.

The hypertext document object may also have HTML codes that reference the browser client to other objects such as image files that are designed for the document object page layout. These images are designed to appear on the browser screen alongside the formatted text. In order to accommodate user control and to minimize image processing time, client browsers in many instances allow alternative handling of image data. For example, browsers may be selectively set to not process images at all, process them in an abbreviated fashion, or allow processing to be interrupted when the user chooses to scroll past an image or leave the document.

HTML codes also exist for directing the browser to selectively access, rather than automatically access, other objects at any Web location worldwide. Typically, an icon image or a portion of visually distinguished text is selected using a mouse or other pointing device to cause the browser to access the referenced object. The referenced object may be another location within the existing object, another object on the same information server, or another information server anywhere on the Internet that supports HTTP. Such hypertext "links" allow easy perusal of related information for users navigating through content arranged in such an organized fashion.

When a service provider makes information or services available from an information server via a communications network such as the Internet, it may be helpful to track the usage of that information or those services (i.e., requests for access to the information at the different areas of the server where the information is located) for many purposes. For example, a service provider could optimize the information content or services based on the popularity of certain types of information or services, or improve the organization of the hypertext linkages so that popular information or services are acquired more quickly and efficiently.

Furthermore, statistical and demographic information regarding client and/or user usage may be helpful in soliciting advertisers and sponsors for particular hyper-media projects. Knowing what kind of information is popular, combined with the audience interested in that information, provides another means of access to cognizable consumer groups. Focused, pinpoint information can also allow better tailoring of information to particular user profiles.

Currently, usage tracking is done on the server side of a system arranged after the client-server model. Every time a request is made from a client, the server will log particular information for future reference and analysis. For example, useful information to track would be the time spent with by client connected to the information server, who the client is, and what files or other objects in the server hierarchy have been requested.

The granularity, or amount of detail, found in server tracked information is dependent upon the accessing protocol. In the World-Wide Web, it is possible to track from the information server side, the following kinds of information: the product and version of the client, the user name of who the request is from, the address of the previous object (referer), amongst other information.

There are a number of problems that exist with respect to information server side tracking that diminishes the value of the information in the usage log. Some of these problems actually impede the efficiency or slow down the delivery system making it inconvenient and annoying to users, since there is an undue amount of lag time between information or object requests and receipt of the requested object from the information server.

One problem is the amount of server overhead in terms of processing, disk access, etc., that is required to keep a server side log of client requests directed to that information server. Because the information server must process such a log, there may be diminished capacity in the processor and other system resources for responding to client requests, thereby reducing the overall throughput of the information server in terms of the amount of information sent to clients.

Another problem is the nature of server-side logged usage data. Often, a complex amount of processing must be done on the server side log in order to glean useful and relevant information. This is due, in part, to the very low level of logging based on asynchronous requests and lack of user or session specific metrics that could aid in the statistical and demographic collection process. In other words, it would be useful to have information aggregated into a number of request-response "transactions" that better model the nature of user activity at the particular information server. Such "session" resolution does not inherently exist in some stateless hyper-media protocols such as HTTP.

Requested data can also be cached at a number of locations between the client and the information server. For example, the client may cache recently acquired information and not generate a request to the information server while one or more users are browsing through information in the client-side cache. This valuable information as to user interest in a particular document may be entirely lost by existing server side usage tracking facilities.

Furthermore, intermediate "proxy" servers or "gateways", which often transparently exist as part of the communications path between the client and the server, may contain information wanted by the client. If such a case arises, the proxy server can fulfill the request without resort to the information server. Consequently, the information server may lose knowledge that a request for that particular piece of information has been made by a client.

Statistically, a very large number of web clients use proxy servers to make direct contact with an information server. Most corporations and online services deploy proxy servers to improve the efficiency of their service to their users (i.e. employees or subscribers) and to provide an added level of security by not allowing direct Internet access to their users' client software.

Another proxy server application occurs when the proxy server provides a logical portion of the Internet with access to information without each client in that logical portion having to communicate with the original source of the information that may be half the world away. For example, all clients in Australia wanting access to a particular object located in Canada would benefit by having a proxy server for that object located in Australia.

The proxy server stores a copy of the object based on the first client to make the request and then all subsequent requests for that object can be serviced by the proxy server rather then the original information server. An object on a proxy server will eventually "expire" and be erased according to some algorithm optimized for overall Internet performance. The algorithm may be based on time, number of requests for the object, proxy server storage capacity, and other relevant factors. Internet users between Australia and Canada also benefit since traffic in that area has been reduced by use of the proxy server, allowing more efficient utilization of the transmission link.

Because the use of a proxy server will in many instances cause an information server to miss important information with respect to client requests, an information server that is able to control proxy server operation will often times be set to force all requests to the information server (i.e., by setting all information to expire immediately), thereby destroying the advantages of reducing network traffic, reducing information server load, and reducing the quality of the users' experience overall.

Other forms of creating greater efficiency or security may inadvertently conceal pertinent information from the information server usage tracking system. Inaccuracies are introduced because of proxies, address translation devices, and other forms of address aggregation.

Other forms of creating greater efficiency may inadvertently conceal pertinent information from an information server usage tracking system. Network address translation boxes ("NATs") are used by various organizations in connecting to the Internet and allow many different client requests to go through a single IP address which hides information from the information server. Specifically, NAT boxes make multiple clients appear as one by sharing a common network address across multiple servers to which the clients are logically connected. A small number of such NAT boxes will allow access for many hundreds or thousands of users throughout an organization causing an identity problem for the information server because of the shared IP address. Thus, to the information server it appears that only one user or client is accessing a particular information server rather than all individuals from an entire organization.

This concealment also occurs when Internet subscription services and national on-line services such as Compuserve® share a common IP address across a number of different subscribers or users. The problem becomes even more exacerbated when an organization uses a network address translation box and has Internet access through means of a subscription service.

Yet another problem that may impair the validity of information server usage tracking statistics are Web crawlers and other forms of automated information gathering. These automated information gathering programs will travel through the Web and categorize the different available objects. Data searches can then be made on this aggregated, organized, and abstracted information to find desirable Web sites.

The information gathering programs will sometimes leave "access tracks" that are not true representations of user activity and hence may skew an analysis of information server usage tracking logs. Despite the aforementioned problems, usage tracking, though imperfect and fraught with potential shortfalls, remains a very important activity in guiding service providers in terms of what to provide and how to organize it. Because of such interest, there exists a strong need to improve the quality of usage tracking whenever possible.

SUMMARY AND OBJECTS OF THE INVENTION

It is an object of this invention to provide a client-side usage tracking system of an information server in situations where the client requests from or posts information to the information server.

It is another object of this invention to offer better usage statistics that more accurately reflect user behavior in accessing information from an information server.

It is a further object of this invention to improve the overall quality and accuracy of statistics tracked by the service provider.

It is still a further object of this invention to provide information on how a user processes objects requested from an information server that otherwise cannot be ascertained by the information server.

It is yet another object of this invention to permit session level and user level tracking without regards to the sharing of IP addresses.

It is an object of this invention to reduce the information server processing and other resource allocation overhead associated with usage tracking.

It is another object of this invention to allow usage tracking statistics to be collected or logged at any desired server, not just the information server.

It is yet a further object of this invention to remain compatible with existing usage tracking schemes and, further, to allow users or clients the authority to selectively access the information server anonymously.

It is an object of this invention to overcome loss of statistical information to service providers due to caching anywhere in the communications path between the user and the information on the information server, including proxy servers.

It is yet another object of this invention to provide proxy servers the ability to track usage of clients.

Additional objects and advantages of the invention will be set forth in the description which follows, and in part will be obvious from the description, or maybe learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, system, and computer program product for client-side usage tracking in the information server is provided.

According to the described embodiment of the present invention, client-side usage tracking is accomplished by a client connecting to an information server with additional information indicating to the server that the client is enabled for client-side usage tracking. In the preferred embodiment, this indication occurs at the initiation of a session, a session being a period of time or a series of transactions where the client makes requests to the information server for information or objects stored at the server.

Upon receipt of the session initiating request event, the information server will return acknowledgement of client-side usage tracking support along with a destination for delivery of the usage tracking log. This destination may be a server available on the communications network and may track usage for a number of information servers. In this way, the information server need not process and maintain the usage tracking log, although it may choose to do so.

If the acknowledgement from the information server confirms client side usage tracking, then the client will begin tracking information server requests and user processing characteristics. Otherwise, the client will assume that usage tracking will be handled by the information server and will, therefore, simply provide standard request processing information to the information server. This form of handshaking allows this innovative invention to be utilized concurrently with client applications and servers that do not implement the methods, advantages, and attributes of the present invention.

Once a session with a particular information server is determined to have ended, the client-side usage tracking log, representing the client object requests and processing during the session, is sent to the designated usage log server. There, it will be aggregated with other usage log segments from other clients and the usage log of the information server itself created on behalf of clients incapable of client-side usage tracking.

In this way, a more complete an accurate usage tracking log is created while achieving greater overall system throughout. Since an information server may be relieved of the task of processing client usage entries, more requests for information may be processed. The overall usage tracking log is also more accurate because ambiguities and errors introduced by proxy servers, organizational Internet gateways, and network address translation boxes are obviated, since the usage tracking is taken at the source of the request rather than the ultimate destination of the request.

Furthermore, additional kinds of information that cannot be tracked by the information server can be tracked by the client. For example, the amount of time browsing a particular file or the amount of the particular object actually viewed can be tracked.

One preferred embodiment fits seamlessly within the hardware and software that make up the World-Wide Web. Certain protocol changes are made at both a Web information server and a Web client in order to implement the present invention. Further, a Web proxy server may also be used to implement the current invention that will provide a certain amount of client-side usage tracking for "non-tracking" clients (i.e., clients not specifically designed to perform client-side usage tracking themselves).

The HTTP protocol used for communications between Web clients and Web information servers is modified so that an additional optional parameter is passed in the request or other packet header to the information server by the "tracking" client (i.e., clients specifically designed to perform client-side usage tracking). It is important to note that, in this preferred embodiment, the mutual identification between tracking clients and client side tracking supporting information servers can occur during the normal course of operations. No extra packets need to be sent. Rather the packet that is sent, regardless of whether the information server allows client side usage tracking or not, has an extra parameter to alert the information server of its client side usage tracking capabilities.

Should the information server be a "CST" server (i.e., one that is enabled to allow client-side tracking), the server will pass an acknowledgement parameter containing the Uniform Resource Locator ("URL") information specifying the location of the server that will receive the client-side usage statistics. When the tracking client is finished gathering the usage statistics, a usage tracking data object is sent by the client to the designated usage tracking server by means of an HTTP "post" operation.

Should the designated information server be a "non-CST" server (i.e., a server that is not enabled to allow client-side usage tracking), the information server will not respond with the header parameter and URL so that a tracking client will know not do client-side usage tracking. If the client is a non-tracking client, the information server will never receive the initial signalling parameter and will handle usage tracking according to its standard procedure.

A variation in implementation of the present invention can be used with proxy servers. A proxy server is a server which can service requests of a client that is configured to the proxy. Clients, both tracking and non-tracking, will direct all requests for information or services from information servers to the proxy. The proxy will attempt to service or fulfill the request from its internal cache and if unable to do so, will direct a request to the designated information server in order to fulfill the request. A "tracking" proxy server may perform usage tracking (i.e., the proxy is a client to the designated information server) for the non-tracking client.

If a non-tracking client initiates a session to a CST information server through a tracking proxy server, the tracking proxy server may handle usage tracking for the non-tracking client. This is accomplished by having the tracking proxy server send the optional header parameter in the initial header object as explained above so that the proxy server does the usage tracking and handshaking with the information server.

Client side usage tracking, whether handled by a client or a proxy server, continues as long as a session between one particular client and one particular server is maintained. A session is a concept presently unknown in the HTTP protocol and is defined by implementation details of the present invention.

Due to the stateless nature of the World-Wide Web and HTTP protocol, a session is begun by certain key events. For example, in the preferred embodiment, a session begins at first contact with a particular information server. The session ends upon the occurrence of one or more of the following events: a certain amount of time has transpired; the request of an object from another information server; upon reaching a certain number of object requests from the current information server; or when the application is exited by the user.

Once the session is completed according to the above mentioned events, the smart client or smart proxy will prepare a usage tracking data object and post it to the usage tracking server as designated by the URL received at the initiation of the session via HTTP. The usage tracking server will process and compile all the usage tracking data objects posted to create an overall usage log. The usage tracking server may be the information server itself or another server available over the Internet or other communications network. If a separate usage tracking server is used, it will also receive data objects posted from the information server on behalf of clients unable to do client-side usage tracking. Furthermore, a single usage tracking server may process the data usage objects from a number of different information servers.

The usage tracking data object is a data packet having certain header information and a number of usage data members representing client usage for particular links at a Web site. The header information will include the version of the usage tracking data object format, the number of usage data members that will be found in the object, the method by which a client is connected to the information server, and an options area for determining what information to track.

The options information permits the information server to communicate to the client or proxy server which of a number of different statistics the tracking agent should record. This allows a level of customization that is in control of the service provider that can be tailored to particular needs and implementations.

The usage data member may contain a number of statistics that are useful to the service providers, some of which are only available from a client side perspective. These include a link option containing full URL of the object accessed by the user, a referring agent option that helps determine how the user arrived at this particular link (i.e. from the information server itself or from a link established at a foreign site), how much time the user spent "browsing" the current object, an "interest" option that gives the percentage of a current object that was viewed or otherwise processed by the user, and an option determining how the user processed any images associated with the object (i.e., whether they were interrupted during download or allowed to become fully visual at the client). Such rich variety of options allows a wealth of information to be communicated to the service provider and allows for content adjustments and demographic reporting. It may be noted that a multitude of other statistics may be determined useful and can be implemented as part of this invention without parting from the spirit thereof.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As used herein, a "client system" is a client computer or other communication hardware/software combination operated by a user.

As used herein, a "proxy server system" is a proxy server or other communication hardware/software combination that has client systems configured to access a service provider indirectly through the system.

As used herein, a "usage tracking system" is a usage tracking server or other communication hardware/software combination where session usage tracking logs may be accumulated and managed.

As used herein, a "service provider" is an organization that provides information and other services electronically over a communications network. The information and services are provided by way of information server systems. "Information server systems" are information servers, a communication hardware/software combination, or other computer systems, that respond to client requests by transmitting requested objects to the clients.

As used herein, a "session" is defined to be at least one request-response transaction between a client system and a service provider.

As used herein, a "session event" is something informationally relevant to session usage tracking or creation and control of a session usage log and included are all types of demographics and statistical information. Usage statistics and statistical information as used herein refers to any relevant information desired for tracking.

As used herein, an "object" is a basic element of information or service that can be accessed from a service provider by a client system.

Figure 1:
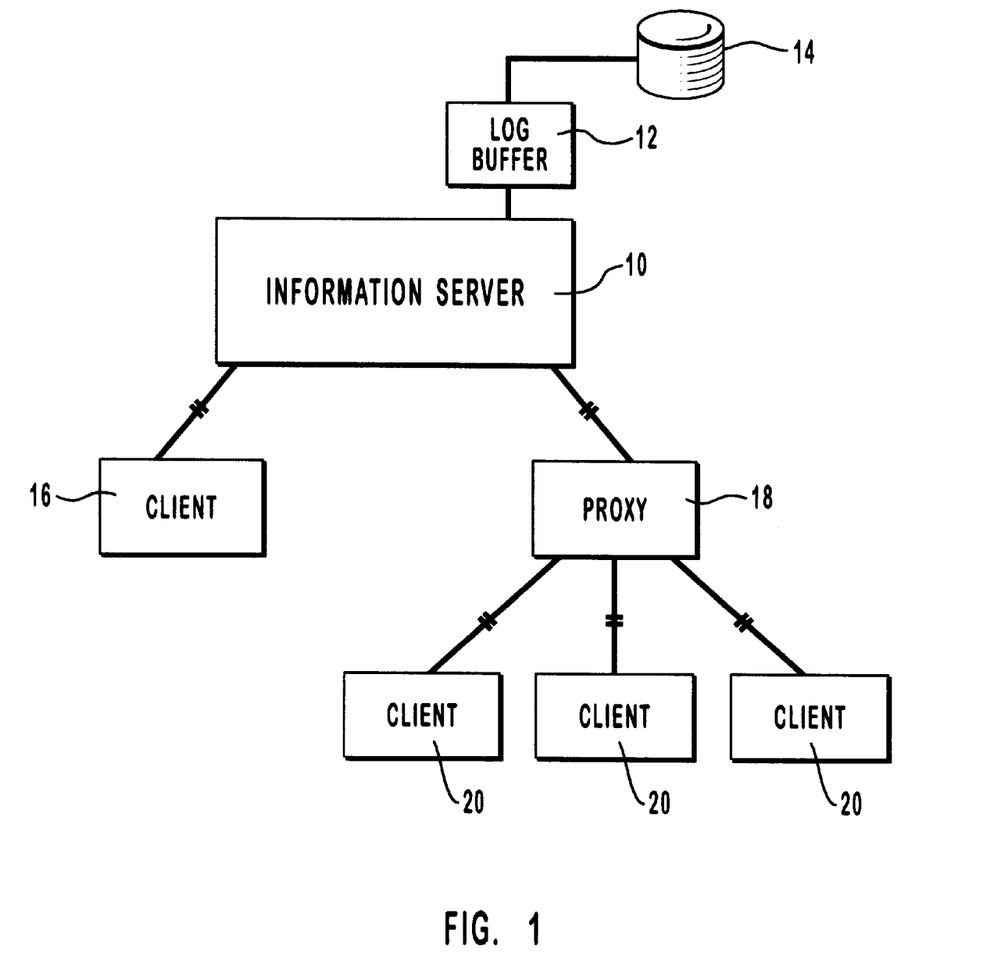
FIG. 1 is a block diagram depicting the logical relationships between an information server, clients requesting access to an information server directly, and clients requesting access to an information server through a proxy server as known in the prior art.

In order to understand a conventional manner in which clients may access information servers over a communications network such as the Internet, reference is made to FIG. 1 as a model of the current state of the art. An information server 10 maintains a usage log buffer 12 for recording objects accessed that are contained thereon by the various clients on the communications network. The results of the statistical information stored in the usage log buffer 12 are eventually stored to disk 14 for further processing and analysis.

Client 16 is directly connected with the information server 10 by means of a network connection. A direct connection means that client requests are passed unmodified to the information server and that the information server 10, rather than a proxy server, will fulfill the client requests.

A proxy server 18 is shown in direct contact with the information server 10 and will in many instances be able to fulfill the requests from indirect clients 20. Therefore, indirect clients 20 are indirectly connected to the information server 10. An indirect connection means that all client requests are fulfilled by the proxy server 18. If the requested information resides at the proxy server 18, the request is fulfilled without communication with the information server 10. Otherwise, the proxy server 18 will make a request to the information server 10 on behalf of the indirect client to bring the originally requested information to the proxy server 18 in order to fulfill the request. In this manner, the processing of client requests is distributed away from the information server 16 in many instances thereby resulting in a more efficient communications network. In turn, a client will see requests fulfilled more rapidly resulting in improved overall performance.

Usage tracking of information contained on the disk 14 is handled by the information server 10 and may not include all relevant information. For example, access requests by indirect clients 20 that are serviced or fulfilled from the proxy server 18's content object cache will not be reflected on the information server 10 usage statistics.

Figure 2:
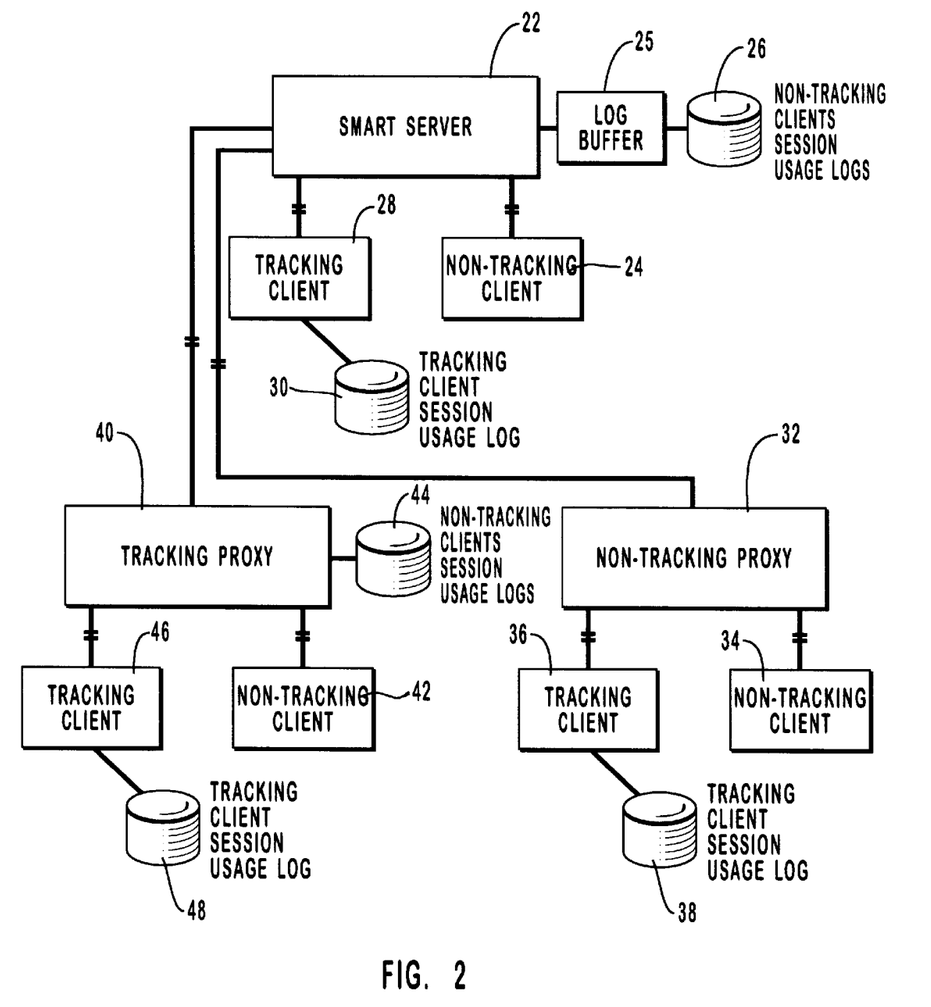
FIG. 2 is a block diagram depicting permutations of connectivity possibilities if the CST information server of the present invention is used, graphically illustrating that a CST server may have direct access by tracking clients or non-tracking clients and indirect access of tracking clients and non-tracking clients through respective tracking and non-tracking proxy servers.

FIG. 2 shows a logical mapping of the different connection permutations encountered by CST information server 22 according to the present invention. A directly connected non-tracking client 24 cannot do client-side usage tracking. Therefore, the CST information server 22 will do conventional server-side usage tracking into usage log buffer 25 and store the results onto disk 26 that is part of the CST server 22.

A directly connected tracking client 28 is able to do client side usage tracking by keeping a session usage log on disk 30 or RAM, local to the tracking client computer, according to the methods of the present invention. Once tracking client 28 ends the session with the CST information server 22, the usage log contained on the disk 30 (or memory) is transmitted to the CST server 22 or some other usage tracking server designated by CST server 22.

A non-tracking proxy server 32 may also have a network connection to the CST information server 22 as explained previously with reference to FIG. 1. A non-tracking client 34 making access to the CST server 22 through the non-tracking proxy 32 is not able to do client-side logging, nor is the non-tracking proxy 32, therefore, the CST server 22 will log any usage with respect to non-tracking client 34 into log buffer 25 and eventually onto disk 26. This will happen in same manner as for non-tracking client 24 though different usage statistics may apply. Again, relevant usage information will not be tracked by CST server 22 if the non-tracking proxy server 32 fulfills the client request without resort to CST server 22.

A tracking client 36 may also be indirectly connected through the network to the CST information server 22 by means of the non-tracking proxy server 32. When this occurs, the tracking client 36 will handle its own session usage tracking and save a session usage log on a disk 38 (or RAM) local to the tracking client computer. This is done in the same manner as the directly connected tracking client 20 as was explained previously with the session log being posted to a designated URL at the end of the session. Again, when the tracking client 36 ends its session with the CST server 22, the session usage log is transmitted from the disk 38 (or memory) to the CST server 22 for processing and incorporation into an overall usage tracking log on the disk 26. Alternatively, the usage tracking log created by the tracking client 36 may be sent to another server (designated by a URL received fro CST server 22) for usage tracking. This is possible because the invention does not require fundamental protocol changes for its operation, merely extensions to the existing protocol.

A tracking proxy server 40 can also be have a direct network connection to the CST information server 22 and provide a means for capturing otherwise lost client usage information when a non-tracking client 42 has an indirect network connection to the CST server 22 through the tracking proxy server 40. Since the tracking proxy server 40 will either fulfill the requests from non-tracking client 42 itself or pass the request onto the CST server 22 in a request originating from the tracking proxy server 40, the tracking proxy server 40 knows of every request made by the non-tracking client 42. Therefore, such requests may be tracked by the tracking proxy server 40 and a session usage log for each non-tracking client may be stored on a disk 44. Again, when the non-tracking client 42 ends its session with the CST server 22, the usage tracking statistics stored in the session usage log on disk 44 are sent to the CST server 22 or some other usage tracking server designated by CST server 22.

Finally, a tracking client 46 may have an indirect network connections to the CST information server 22 through the tracking proxy server 40. The tracking client 46 does its own usage tracking and stores statistical information in a session usage log on a disk 48 (or in RAM) local to the tracking client computer. Such information will then be sent to the CST server 22 once the tracking client 46 completing its session with the CST server 22. Although this could also be handled by the tracking proxy server 40, in the preferred embodiment, the tracking client 46 does the logging of the session usage log locally which builds a more efficient and scalable system.

Figure 3:
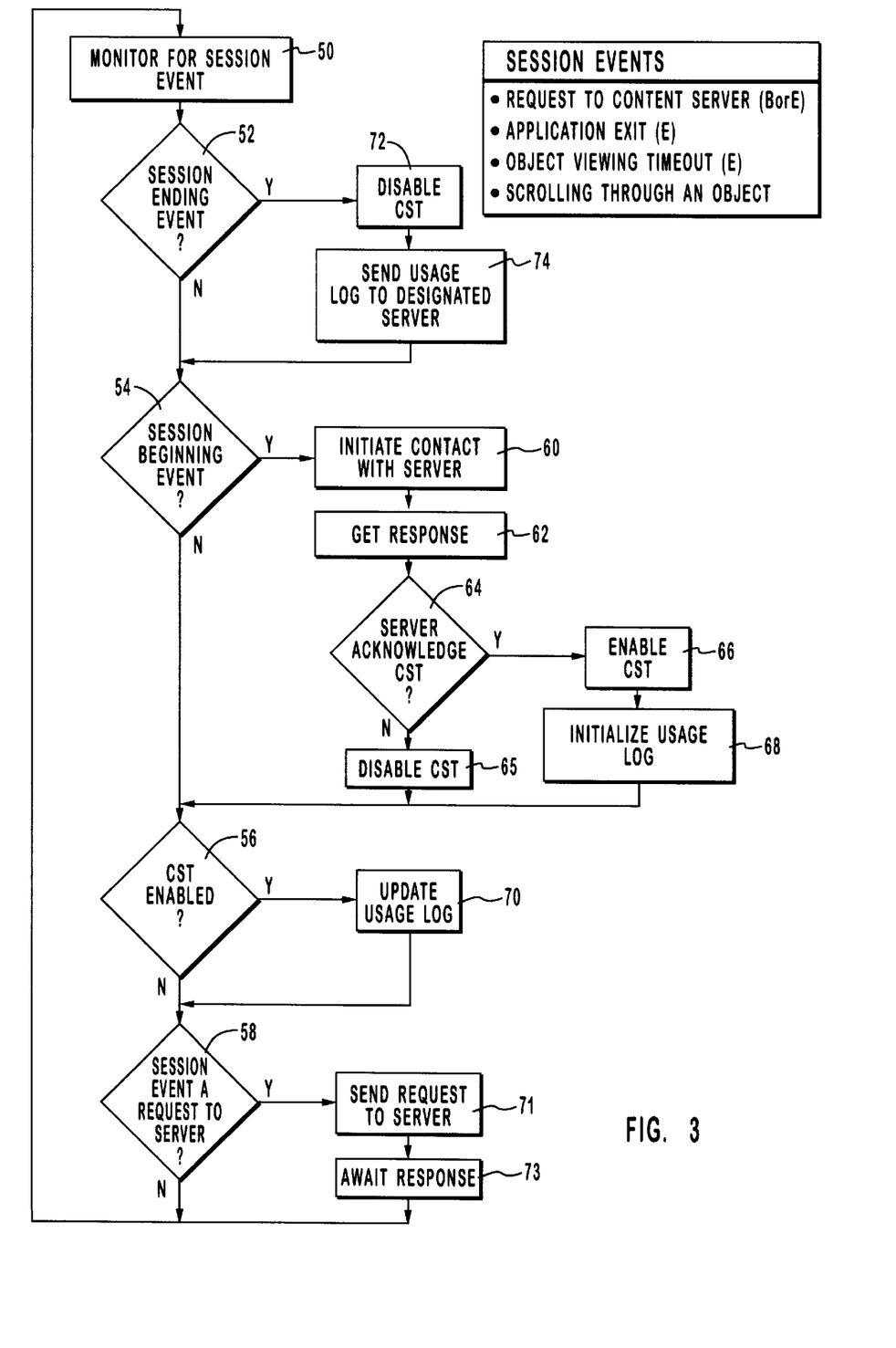
FIG. 3 is a flowchart depicting the logical operation of a tracking client when certain session related events are processed according to the present invention.

Referring now to FIG. 3, a detailed explanation of the operation at a tracking client is undertaken based on the processing of a relevant "session event." Since the HTTP protocol is a stateless protocol, there is presently no concept of a session between a client and an information server. Therefore, one presently preferred embodiment of the present invention manages the concept of a session as a series of transactions between a client and an information server or a period of time after initiating contact with an information server. If a client is in continual contact with an information server for an extensive amount of time, this would be represented as multiple, back-to-back sessions with the same information server.

During the course of a session (e.g. at the beginning, middle or end) certain events occur that are relevant to operation of the present invention. These "session events" are usually in response to user action in operating the client software.

Three categories or types of event are important in controlling the operation of smart client with respect to client side usage tracking. These categories are session ending events, session beginning events, and session information events, and are defined by the operations that the smart client must do in response to the particular event. A session beginning event requires the smart client to initiate contact with the information server to ascertain whether the contact server is capable of CST. Typically, this occurs when the user causes the client to make a request to the information server for a particular object.

The tracking client and a CST information server must "negotiate" to determine whether CST can take place. This is done by the client sending a "CST header" and the CST information server returning some form of acknowledgement containing a designation of a usage tracking server where the session usage log will be sent. By way of example and not limitation, a URL may be used to designate a usage tracking server. As used herein, a "CST header" refers to any way of signifying to the CST information server of the tracking client's capability to do CST.

One way to create a CST header occurs relatively conveniently in the HTTP protocol. Within the request header according to the HTTP protocol, a "pragma" field is passed followed by a "trackinfo" entry. This signals to the information server that the client is capable of and requesting to do CST. The CST information server will return in the response header associated with the requested object a URL designating where the session usage log created by the tracking client for this particular session will eventually be posted when this particular session has ended. Those skilled in the art will recognize many ways of communicating a tracking client's status to a CST information server and designating a usage tracking server, and the above suggestion with respect to the HTTP protocol is given by way of example and not limitation.

Referring to FIG. 3, a session event is received or otherwise generated at step 50. Such a session event is processed through a main loop that interprets the event and determines whether the session event is a session ending event at step 52, a session beginning event at step 54, whether the information associated with the session event will be used to update the client usage log after determining whether CST is enabled at 56, and/or whether the session event requires access to the information server at step 58. A session event may require processing at any or none of these points depending on the context of the client at the time the session event is generated and the nature of the session event itself. This will be explained in greater detail hereafter and will be apparent as the operation of the smart client is explained.

A session event includes but is not limited to any of the following: a request for an object directed to an information server, exiting the application, viewing an object after initiation of a session beyond a set amount of time (object viewing timeout), scrolling through a visually viewed object thereby indicating the percentage of the object viewed, otherwise processing an object (e.g., printing might be an event that is desirable to record), etc.

When a session event is determined to be a session beginning event at step 54, the smart client will initiate contact with the information server at step 60 in order to learn the URL of the designated server to receive the session usage log produced by the client at the end of the session. The URL is received by the smart client at step 62 if the information server acknowledges CST.

The smart client will determine at step 64 whether CST has been acknowledged by the server and if so will enable CST for the smart client at step 62 and initialize a session usage log at step 68. Initialization of the session usage log requires allocating memory at the client computer and/or file storage. To initialize the session log, certain header information that will be interpreted by the usage server as well as global information for the session is stored. For example, the version of the trackinfo object is included and the method by which the tracking client is connected to the information server is specified. For example, a tracking client may have a direct network connection over a high speed connection, such as ISDN or cable modems, or other forms of connection such as a dial-in over a modem on a non-permanent low speed connection or through some sort of proxy technology as used by bulk Internet service providers and online services.

It may be noted that this initial contact with server as described for step 60 will occur in conjunction with an HTTP Request for an object directed to the information server. Furthermore, additional information may be received from the information server when the Response is received at step 62 that directs the client as to what information the smart client should track. In this manner, the information server continues to direct the process of usage tracking though the actual details of usage tracking are accomplished at the smart client.

If a session event is determined to be a session ending event at step 52, the client will disable CST at step 70 and send or post (via HTTP) the session usage log consisting of trackinfo objects to the designated usage log server at step 72. The session usage log contains the header information previously described and a number of "trackinfo" objects corresponding to each requested primary content object acquired or processed by the tracking client.

A primary object is one that is requested by the user of the smart client by actual HTTP reference or through the use of an automated hyper link. A secondary object is one that is processed incidental to the selection of a primary object. For example, images associated with a HTML document are automatically handled in some form or another as a result of processing an originally requested HTML document.

Many of the session events will be for updating the usage log as a user processes an object or makes new requests to the information server. If CST is enabled at step 56, a session event will be used to update the session log at step 70. The session log will only be updated and the session event processed if CST is enabled, otherwise, the client will be doing no usage tracking on behalf of the information server.

The kinds of information that are stored or tracked with respect to client usage is summarized in the following table. The information is illustrative rather than limiting and all aspects discussed need not be included in a particular embodiment and there remain other forms of useful information which those skilled in the art will be able to clearly discern and implement as necessary.

| Information | Description |
|---|---|
| Primary Requested Object (aka "Link") | This is the full URL of the requested object for processing by a user operating a smart client. A user may manually inputs into the smart client, select a hypertext link in a processed object, or otherwise cause the URL to be available to the client. For example, the user could simply type the following URL for processing: http://www.xyz.com/info.html |
| Link Acquisition | This tells how the link was acquired in an encoded form if not from a hypertext link in a previous object. For example, the link can be manually input, taken from a "hotlist" of saved links at the smart client, "referred" from the current information server, referred from a different information server, acquired from the local cache, or acquired from a proxy server. This is information that may normally be difficult or impossible for an information server to otherwise determine. |
| Referring Object (aka "Referrer") | This is the URL of the previous object from which a hypertext link indicated the current processed primary object. This is useful for determining how a user enters into an information server and can help determine the effectiveness of various forms of interest generating methods. For example, the effectiveness of leased space (advertisements) on a more well known homepage can be assessed by how much activity it generates. |
| Time Spent Processing Link | How long a user spends observing a particular document or object can be tracked. After a certain amount of time has expired an object viewing timeout will occur to end the session. Since the World-Wide Web is based on a stateless protocol, an information server will have no way of tracking this information on its own. |
| Interest Level (amount of object processed) | Many times, a requested primary object cannot be processed immediately. If it is a text object, the user will scroll through the text until the end of the object is reached. If after viewing a portion of object, the user determines that the object is of little interest, she may choose another object. In like manner, if viewing an animation object, a viewer may terminate processing before reaching the end. In such cases it is useful to know an approximation of how much of the object was actually processed by the smart client under user direction as a gauge of the user's interest in that object. This form of information cannot be ascertained by an information server since the entire object is typically sent to a client so that the information server has no way of knowing how much was actually viewed or otherwise processed by the user. |
| Image (or other secondary object) Handling | A requested primary object may have other secondary objects that are subsequently requested from the information server as part of the processing of the primary requested object. For example, a text object requested by the smart client may have image objects associated therewith. Because of the relatively large size of image data as compared to text data, processing of images is associated with communications delays as the image is passed over the communications network to the smart client for processing. There exist client options for handling the secondary objects associated with a primary requested object. Sometime the client is instructed to simply not make the transactions with the information server to acquire the images. In other instances the acquisition of the secondary image objects is interrupted by the client scrolling past the location of the image on the client viewing area or by activating a hypertext link to another URL. This secondary object handling information is encoded and tracked and helps a service provider to know how to provide such secondary objects for better utilization by the smart clients. |
| | This is information that would not otherwise be easily available to an information server under a server side tracking scenario. |

Referring back to FIG. 3, should a session event be determined to be a session ending event at step 52, the smart client will quit building the session log, discontinue CST, and send or post (via HTTP) the session log to a designated computer on the network (usually a usage log server). CST is disabled at step 72 where information from the session ending event is also incorporated into the session log. Those skilled in the art will clearly see that a client may be configured to handle multiple sessions, each session with a different information server. The tracking client may be constituted to keep multiple session logs, and have an inactivity timer associated with each session so that inactivity for a given session will generate a session ending event with respect to that information server rather than switching to a different information server.

At step 74, the data structure representing the session log, including all relevant information and statistics, is completed and the entire structure sent or posted to the designated URL that was determined during the initial hand shaking between the smart client and the smart information server. The session log representing the session will be incorporated or otherwise processed by the usage log server with other session logs by other smart clients.

Examples of a session ending event in the described embodiment include: requests to an information server other than the information server with which the session was initiated; an application or operating system exit; expiration of a certain time-out value while viewing a given object (inactivity timeout); session time limit; modem shut down; and other criteria that clearly signifies the end of a session.

It is important to remember that a session event may be one or more of the differing types. In other words, a session event could simultaneously end one session, begin another session, and provide relevant information to be tracked. For example, should a user initiate contact with a new information server, this session event would end the previous session causing a session log to be sent to the previously designated information server as well as signal the beginning of a new session wherein the initial contact with the information server and initialization of the new session usage log as represented in steps 60 through 68 is accomplished.

Furthermore, the interpretation of the type of a certain session event is determined by the context or state of the smart client. For example, attempting initiation to an information server would only be interpreted as a session ending event if there is an ongoing or open session with another distinct information server.

When a session event requires contact with an information server and that has not yet been achieved through prior processing, the client determines that contact with the information server yet needs to occur at step 58. The request is sent to the information server at step 71 at which point the smart client will await a response at step 73. Multi-tasking operating systems may allow modifications wherein a client may continue to generate session events while waiting for the response at step 73 and those skilled in the art will readily recognize such advantages and modifications.

Proxy servers are increasingly common on computer networks and can be used advantageously as part of the present invention. A proxy server can be envisioned as a form of cache that exists in the network logically between an information server and a client and is used to provide greater security and enhance overall response time performance to users by reducing network traffic. Furthermore, proxy servers may be cascaded so that there exists one or more proxy servers between a client and a given information server. In such an arrangement, it is advantageous to push client request processing and usage tracking as close to the client as possible.

By configuration, a client will direct all requests to a proxy server for servicing, indicating the information server where the desired information is located. The proxy will return the requested information to the client either from an internal cache or after contacting the information server. Therefore, if multiple clients connected to the same proxy server request the same information, the proxy server theoretically only makes one request to the information server.

The server, however, may have control over how long information will remain in a proxy server's cache by specifying short expiration values for such objects. Many times, service providers will specify an immediate expiration in order to force all requests to the information server in order to attain the best demographic and usage tracking possible. A tracking proxy server according to the present invention allows a CST information server to provide greater expiration times on requested objects since there is no fear of lost demographics and other usage tracking. In fact, enhanced usage tracking may even be possible.

Figure 4A:
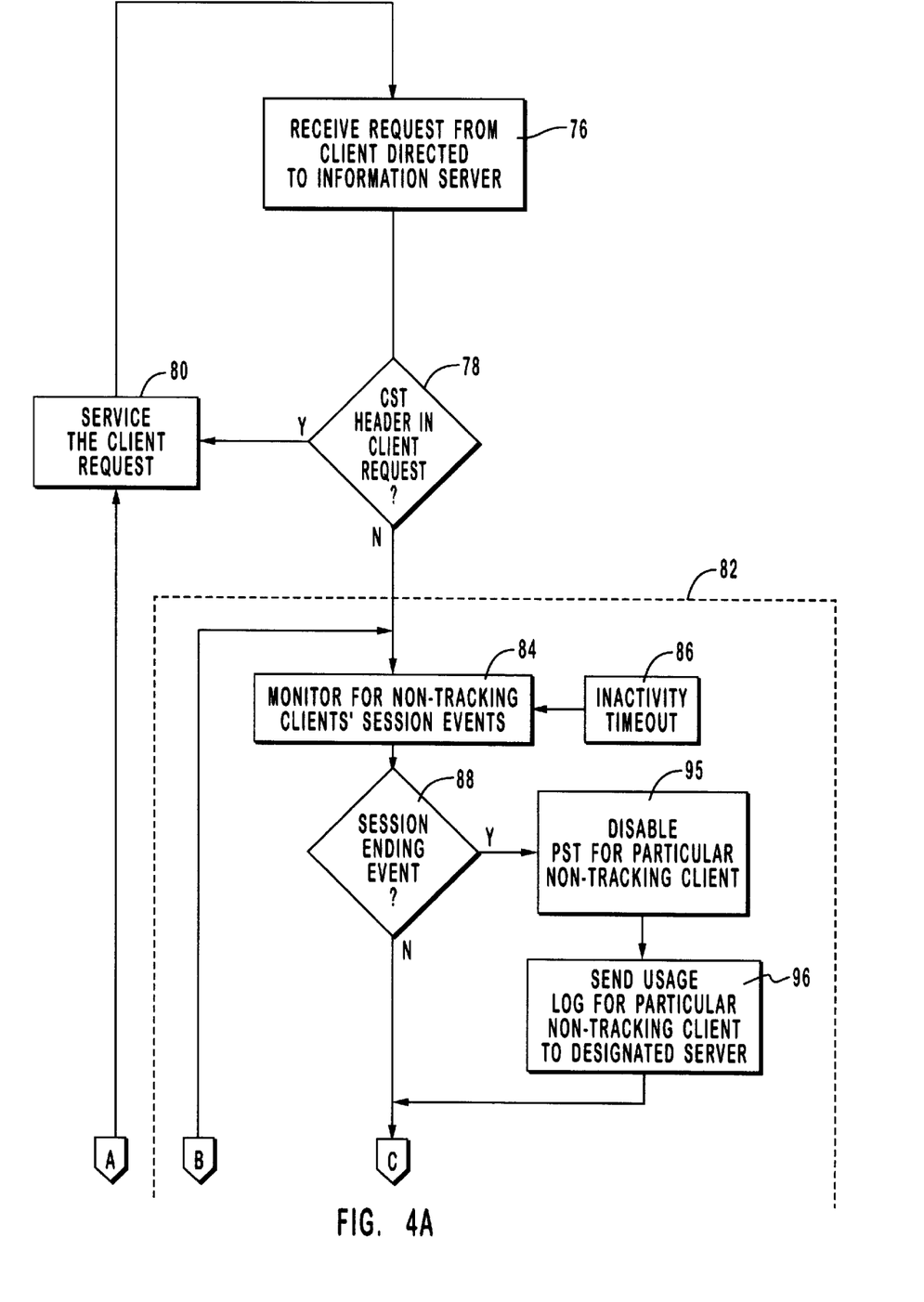
FIGS. 4A and 4B are a flowchart depicting the logical operation of a tracking proxy when receiving information server access requests.
Figure 4B:
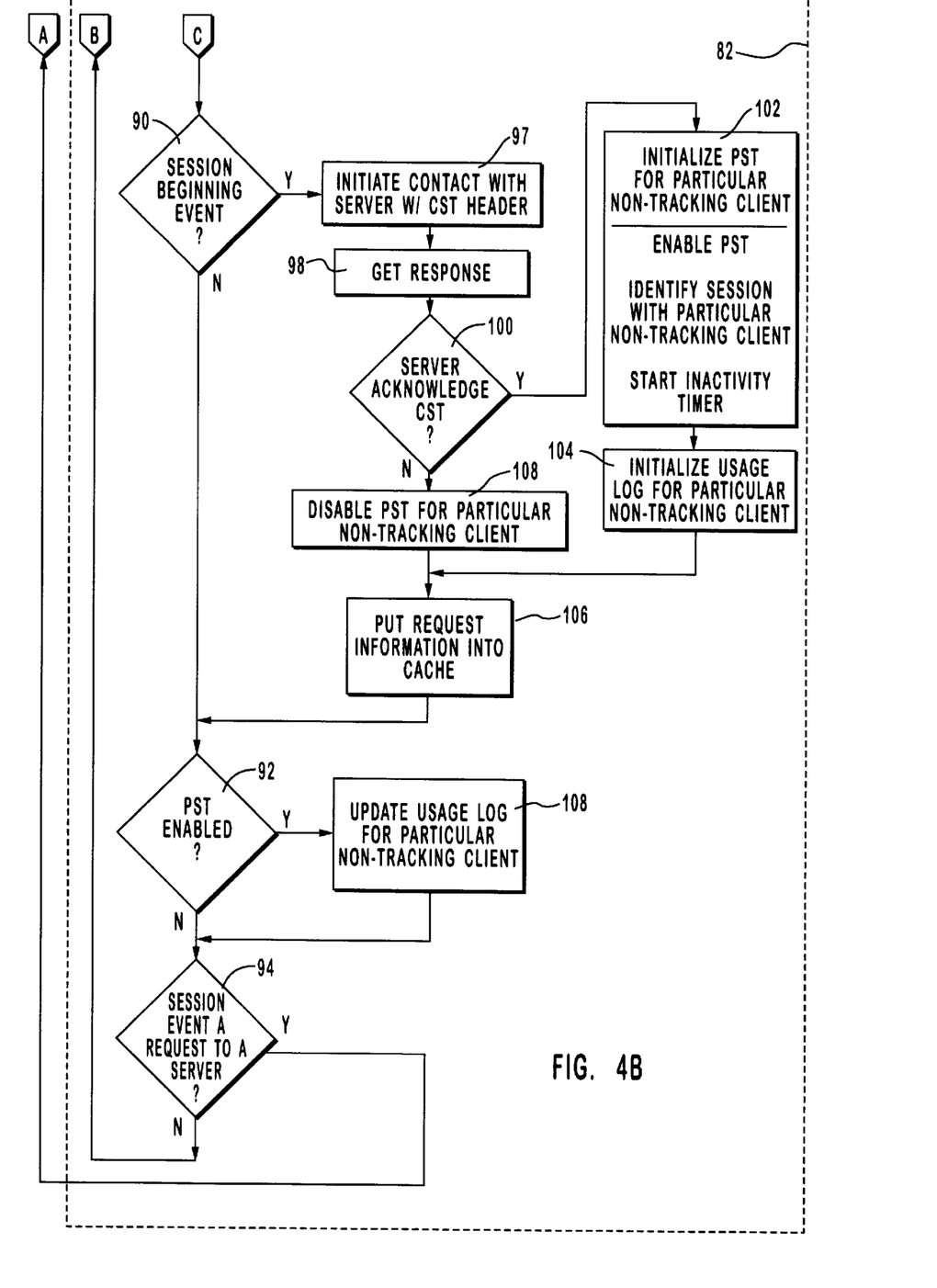

FIGS. 4A and 4B show the logical flow of a client request through a tracking proxy server. The tracking proxy server first receives a request directed to an information server at step 76 (FIG. 4A). At step 78 the tracking proxy server will determine whether a CST header is present in the request indicating that the request originated from a tracking client (including a tracking proxy). If the client is a tracking client, then the request may be serviced or passed on to the information server at step 80.

The tracking proxy server will be able to service a request if the requested object resides locally with the tracking proxy server cache. Otherwise, the tracking proxy server will request the object from the designated information server at step 80.

The tracking proxy server will also retain a copy of a requested object for a specific period of time according to expiration instructions from the information server. The algorithm for "holding" an object is designed to optimize network performance and user response time. In this manner, the next client that requests that particular object will be able to receive that object from the proxy server rather than resorting to the actual information server itself.

If it is determined that the client making the request is not a tracking client at step 78, the request is passed as a session event into the proxy-side tracking ("PST") processing loop enclosed by dashed line 82. PST session event processing is logically similar to CST session event processing as described and explained in connection with FIG. 3 with some differences. It is done on a non-tracking client basis (i.e., the tracking proxy monitors and processes events for multiple non-tracking clients) and servicing the actual request may or may not require access to the information server depending on whether the requested object resides in the tracking proxy cache. Each session event will have a form of non-tracking client ID in order to identify the session event with a particular non-tracking client.

Because some information servers will have CST capability and others will not, there will be PST on behalf of only non-tracking clients that are acquiring objects from CST capable information servers. If PST is unsuccessfully attempted, then processing will eventually proceed in conventional fashion as described in connection with step 80.

Besides requests, other session events monitored at step 84 include inactivity timeouts for particular non-tracking clients generated at step 86. An inactivity timer is started for each non-tracking client at the initiation of a session (explained hereinafter in detail). Should the client pass the timer threshold, a timeout event is generated and processed according to context. Some session events available to CST capable client are not currently present to the tracking proxy such as an application exit, actual client processing of an object, etc.

Similarly to the tracking client session event processing described previously in connection with FIG. 3, the tracking proxy server will determine whether a session event for a particular non-tracking client is a session ending event at step 88, is a session beginning event at step 90, requires tracking (i.e., PST enabled for the particular non-tracking client) at step 92, or is a request to an information server at step 94. Again, according to context, a single session event may fit into one or more of the above enumerated categories.

If a session event is determined to be a session ending event at step 88, PST for that particular non-tracking client will be disabled at step 95. Next, the session usage log for the non-tracking client will be sent to the previously designated server identified by a URL at step 96.

If a session event is determined to be a session beginning event at step 90 (FIG. 4B), the tracking proxy server must determine whether or not to initiate PST on behalf of that particular non-tracking client and the information server designated in the request. In order to determine this, resort is made to the information server itself at step 97. The tracking proxy server will create a CST header for the request and initiate such with the information server in the same manner as a tracking client would initiate a session.

As far as the CST information server is concerned, client side tracking by a tracking client or proxy side tracking by a tracking proxy server will appear the same. However, PST on behalf of non-tracking clients will not be able to track the same granularity and user-perspective information as client side tracking methods described previously. In some embodiments, it may be desirable to have the CST information server distinguish between PST (tracking proxy server) and CST (tracking client).

After the tracking proxy server attempts contact with the information server at step 97, it awaits a response from the information server at step 98. If the information server acknowledges CST (i.e., capability for non-information server tracking) in the response as determined at step 100, the tracking proxy will initialize PST at step 102 by: enabling PST and recording the designated URL to receive the session usage log at the end of the session, identifying the session with the particular non-tracking client, and starting an inactivity timer for the particular non-tracking client.

Also, a session usage log is initialized for the non-tracking client's session with the CST information server at step 104. Next, the information requested is placed in the tracking proxy cache at step 106. It may be noted that regardless of expiration rules, the requested information will be available for transmission to the particular client when this particular request is later serviced for the non-tracking client.

Also noteworthy are alternative ways that CST capability of the information server may be ascertained. For example, information servers that have transacted with the tracking proxy server previously may have the desired information residing in the tracking proxy cache including the designated URL. In such a case, resort to the cache alone may be sufficient to both service the request as well as determine the URL destination for the session usage log. Those skilled in the art will see that variations in the logical flow illustrated here may be made as implementation variations.

If the information server does not acknowledge CST (i.e., capability for non-information server tracking) at step 100, the tracking proxy server will disable PST for the particular client at step 108 to therefore let all requests be tracked by the information server. The requested object is put into the tracking proxy cache at step 106 so that it will be available at the tracking proxy for other clients requesting that object without having to contact the actual information server.

All client session events are viewed in terms of whether or not PST is enabled at step 92. If PST is enabled at step 92, then the session usage log for the particular non-tracking client is updated according to the nature of the session event at step 108. Proxy side tracking on behalf of non-tracking clients will not be able to track the same granularity and user-perspective information as client side tracking methods such as "interest level", or whether or not a document was viewed from the client's local cache.

Finally, if the session event is determined to be a request to an information server at step 94, the request is serviced at step 80 (FIG. 4A). Otherwise, the tracking proxy server will await other session events on behalf of non-tracking clients at step 84.

Figure 5:
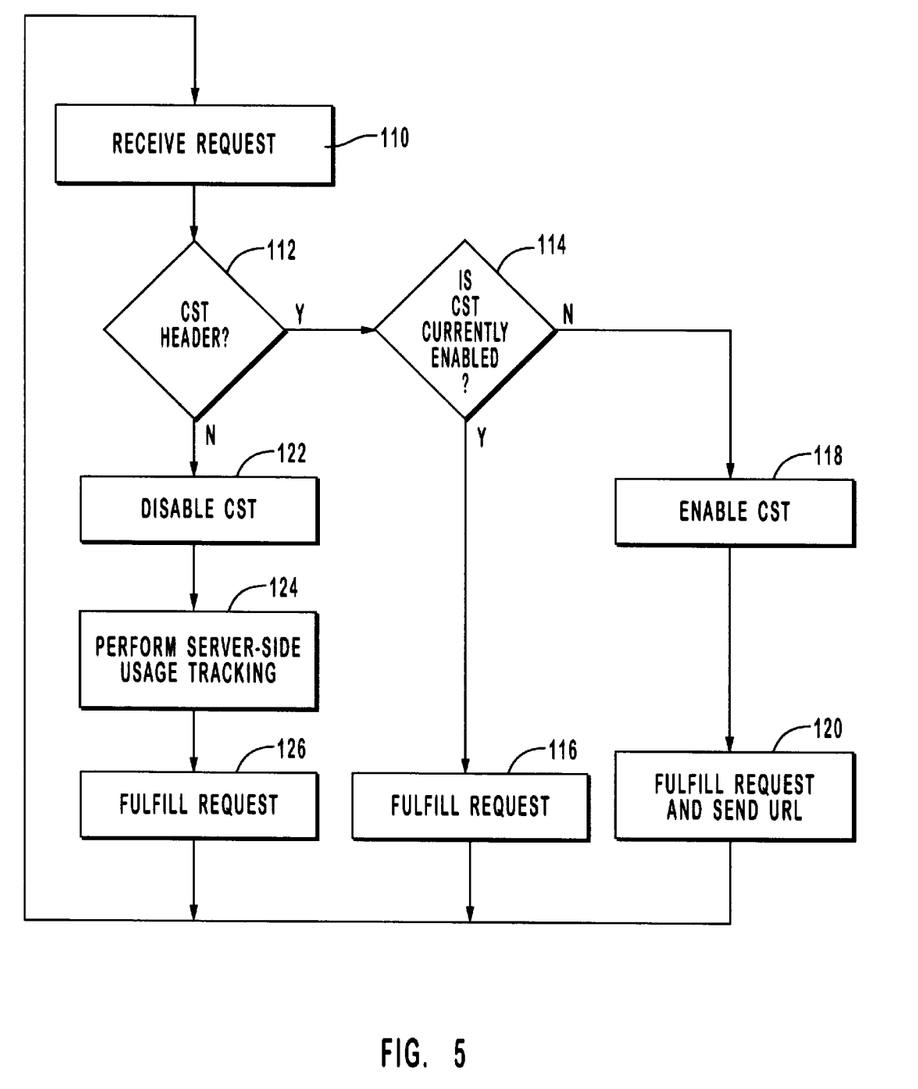
FIG. 5 is a flowchart depicting the logical operation of a CST information server when receiving requests from a client (either directly or indirectly through a proxy).

FIG. 5 is a flowchart showing the logical operation of a CST information server in processing a request from a client. As far as this particular implementation is concerned, the CST information server does not distinguish between requests originating from clients or passed through by proxies.

The request is received at step 110 and the CST information server checks for the CST header or other indication of non-information server tracking. If a CST header is determined to be present at step 112, then the CST information server will check to see if CST is currently enabled for the particular client at step 114. This is done so that the CST information server may distinguish between the first time a client has contacted the server and subsequent contact.

If CST is determined to be enabled at step 114, the CST information server fulfills the request at step 116 without tracking the usage. Otherwise, the CST information server will enable CST for this particular client at step 118 and, knowing that this is the first contact by this client, will include a URL at step 120. The URL will be included in the response to the request and will notify the tracking client or tracking proxy server where to post the session usage log at the termination of the session.

Some embodiments may alter CST information server processing to include the designation URL with every response to a request having a CST header. That way, the only determination that would be made is whether a CST header is part of the request at step 112. If so, the URL would be returned, if not, processing would be the same as illustrated below step 112 in FIG. 5.

By returning the URL with each response, different usage tracking servers could be designated based on a predetermined criteria from a single CST information server. For example, all requests for one logically related set of information requested could be sent to usage tracking server A while objects requested from another logically related set residing on the same information server could be sent to usage tracking server B. A tracking client would interpret a change in URL as an ending/beginning event if tracking only one session or it could properly log usage tracking statistics to the appropriate session based on the CST information server supplied URL for identification.

Referring back to FIG. 5, if no CST header is present at step 112, the CST information server will disable CST for the particular client at step 122, perform server side tracking at step 124, and fulfill the request at step 126 by way of a response.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes or variations from the disclosure herein which come within the meaning and range of equivalency of the claims are to be embraced within their scope.

What is claimed and desired to be secured by United States Letters Patent is:

1. In an information server system comprising a network with at least one information server accessed by a plurality of either client systems or proxy servers, each proxy server in turn accessed by a plurality of client systems, and wherein at least some of said proxy servers are non-tracking proxy servers and the other proxy servers are tracking proxy servers, and at least some of the client systems are non-tracking client systems and the other client systems are tracking client systems, a method for tracking at one or more client systems session events resulting from information supplied by the information server in response to requests for information from at least one of the client systems or one of the proxy servers, while maintaining system compatibility with those client systems or proxy servers that do not have tracking ability, the method for tracking comprising the steps of:

initiating, by at least one client system or proxy server, a connection request to an information server system, said connection request also signifying whether said client system or proxy server is non-tracking or is capable of tracking given session events;

in response to said connection request, returning to said requesting client system or requesting proxy server (i) information requested, (ii) an acknowledgment by said information server system which enables said requesting client system or requesting proxy server to begin tracking said session events if the requesting client system or requesting proxy server is capable of tracking such session events, and (iii) a location of a designated server for receiving tracked session event;

in response to said acknowledgment, if said requesting client system or requesting proxy server is a tracking client system, monitoring said session events and generating a client side usage log of the monitored session events, and if said requesting client system or requesting proxy server is non-tracking, then generating a usage log of the monitored session events at the information server system; and thereafter transmitting the usage log that is generated either at the requesting client system or requesting proxy server, or at the information server, to said designated server.

2. A method for tracking as recited in claim 1 wherein the generated usage log is transmitted after the client system has been inactive a fixed amount of time with respect to said information server.

3. A method for tracking as recited in claim 1 wherein the generated usage log is transmitted after the client system has accessed a set number of objects or files.

4. A method for tracking as recited in claim 1 wherein the generated usage log is transmitted after the client system attempts connection to a different information server system.

5. A method for tracking as recited in claim 1 wherein the generated usage log includes information regarding a referring link where the client system previously accessed objects or files.

6. A method for tracking as recited in claim 1 wherein the generated usage log includes information regarding treatment of image data associated with a particular link.

7. A method for tracking as recited in claim 1 wherein the generated usage log includes information regarding a percentage amount processed by the client system of a particular object or file.

8. A method for tracking as recited in claim 1 wherein the generated usage log includes information regarding amount of time spent by the client system in accessing a particular object or file.

9. In an information server system comprising a network with at least one information server accessed by a plurality of either client systems or proxy servers, each proxy server in turn accessed by a plurality of client systems, and wherein at least some of said proxy servers are non-tracking proxy servers and the other proxy servers are tracking proxy servers, and at least some of the client systems are non-tracking client systems and the other client systems are tracking client systems, and wherein tracking is desired for one or more client systems session events resulting from information supplied by the information server in response to requests for information from at least one of the client systems or one of the proxy servers, while maintaining system compatibility with those client systems or proxy servers that do no have tracking ability, a computer program product comprising:

a computer readable medium associated with one or more client systems at which the tracking of session events is desired; and computer program code means stored on said computer readable medium, said computer program code means comprising means for performing the desired tracking of said session events comprising:

code means for initiating, by at least one client system, a connection request to an information server system, said connection request also signifying whether said requesting client system is a non-tracking or a tracking client system that is capable of tracking given session events;

code means for receiving an acknowledgment from said information server system in response to said connection request which (i) enables said requesting client system to begin tracking said session events if the requesting client system is a tracking client system, and (ii) identifies a designated server for receiving tracked session events;

code means for monitoring said session events and generating a client side usage log of the monitored session events if the client system is a tracking client system, and for causing the information server to generate a usage log if the client system is a non-tracking client system; and code means for transmitting the client side usage log to said designated server after a session is complete.

10. In an information server system comprising a network with at least one information server accessed by a plurality of either client systems or proxy servers, each proxy server in turn accessed by a plurality of client systems, and wherein at least some of said proxy servers are non-tracking proxy servers and the other proxy servers are tracking proxy servers, and at least some of the client systems are non-tracking client systems and the other client systems are tracking client systems, and wherein tracking is desired for one or more client systems session events resulting from information supplied by the information server in response to requests for information from at least one of the client systems or one of the proxy servers, while maintaining system compatibility with those client systems or proxy servers that do not have tracking ability, a computer program product comprising:

a computer readable medium associated with the at least one information server; and computer program code means stored on said computer readable medium, said computer program code means comprising means for enabling the desired tracking of said session events comprising:

code means for receiving from at least one client system or from at least one proxy server a connection request, said connection request also signifying whether said requesting client system or requesting proxy server is non-tracking or is capable of tracking given session events; and code means for initiating an acknowledgment by said information server system in response to said information request which (i) enables said requesting client system or said requesting proxy server to begin tracking said session events if the requesting client system or requesting proxy server has tracking capability, and (ii) identifies a designated server for receiving tracked session events from said requesting client system or requesting proxy server after they have been monitored by the requesting client system or requesting proxy server and stored in a client side usage log.

11. A computer program product as recited in claim 9 or 10 wherein the information server system and the designated server are the same.

12. A computer program product as recited in claim 9 or 10 wherein the generated usage log is transmitted after the client system has accessed a set number of objects or files.

13. A computer program product as recited in claim 9 or 10 wherein the generated usage log is transmitted after the client system has been inactive a fixed amount of time with respect to the information server system.

14. A computer program product as recited in claim 9 or 10 wherein the generated usage log is transmitted after the client system attempts connection to a different information server system.

15. A computer program product as recited in claim 9 or 10 wherein the generated usage log includes information regarding a referring link where the client system previously accessed objects or files.

16. A computer program product as recited in claim 9 or 10 wherein the generated usage log includes information regarding treatment of image data associated with a particular link.

17. A computer program product as recited in claim 1 or 9 wherein the generated usage log includes information regarding a percentage amount processed by the client system of a particular object or file.

18. A computer program product as recited in claim 9 or 10 wherein the generated usage log includes information regarding the amount of time spent by the client system in accessing a particular object or file.

19. An information server system comprising:

a network with at least one information server accessed by a plurality of either client systems or proxy servers, each proxy server in turn accessed by a plurality of client systems wherein at least some of said proxy servers are non-tracking proxy servers and the other proxy servers are tracking proxy servers, and at least some of the client systems are non-tracking client systems and the other client systems are tracking client systems;

as a first article of manufacture, a first computer readable medium stored on said information server, said first computer readable medium comprising first program code means stored thereon;

as a second article of manufacture, a second computer readable medium stored on at least one of said proxy servers or one of said client systems, said second computer readable medium comprising second program code means stored thereon; and said first and second computer program means together providing a system for tracking at one or more of the tracking client systems or at one or more of the tracking proxy servers, session events resulting from information supplied by the information server in response to requests for information from at least one of the client systems or proxy servers, while maintaining system compatibility with other non-tracking client systems or proxy servers that do not have such tracking ability, the system comprising:

code means for initiating, by at least one client system or proxy server, a connection request to an information server system, said connection request also signifying said client system's or said proxy server's ability to track given session events;

code means for returning to said requesting client system or proxy server in response to said connection request (i) information requested, (ii) an acknowledgment by said information server system which enables said requesting client system or proxy server to begin tracking said session events when they are capable of doing so, and (iii) a location of a designated server for receiving tracked session events;

code means for monitoring, by said requesting client system or said requesting proxy server, said session events and generating a client side usage log of the monitored session events when the requesting client system or proxy server have tracking ability, and for causing the information server to generate a usage log of the monitored session events when the requesting client system or proxy server to not having tracking ability; and code means for transmitting the either the client side usage log or the usage log generated by the information server, as applicable, to said designated server after a session is complete.

20. A system as recited in claim 19 wherein the information server system and the designated server are the same.

21. A system as recited in claim 19 wherein the generated usage log is transmitted after the client system has accessed a set number of objects or files.

22. A system as recited in claim 19 wherein the generated usage log is transmitted after the client system has been inactive a fixed amount with respect to the information server.

23. A system as recited in claim 19 wherein the generated usage log is transmitted after the client system attempts connection to a different information server.

24. A system as recited in claim 19 wherein the generated usage log includes information regarding a referring link where the client system previously accessed objects or files.

25. A system as recited in claim 19 wherein the generated usage log includes information regarding treatment of image data associated with a particular link.

26. A system as recited in claim 19 wherein the generated usage log includes information regarding a percentage amount processed by the client system of a particular object or file.

27. A system as recited in claim 19 wherein the generated usage log includes information regarding the amount of time spent by the client system in accessing a particular object or file.

* * * * *

UNITED STATES PATENT AND TRADEMARK OFFICE
CERTIFICATE OF CORRECTION

PATENT NO. : 6,018,619
DATED : January 25, 2000
INVENTOR(S) : James E. Allard, et. al.

It is certified that error appears in the above-identified patent and that said Letters Patent is hereby corrected as shown below:

Col. 2, ln. 41: after "spent with" change "by" to --a--

Col. 5, ln. 18: after "description, or" change "maybe" to --may be--

Col. 6, ln. 50: before "not do" delete [know]

Col. 10, ln. 6: after "in" and before "same manner" insert --the--

Col. 10, ln. 26: after "received" change "fro" to --from--

Col. 10, ln. 30: after "also" and before "have" delete [be]

Col. 11, ln. 1: after "server" change "or" to --over--

Col. 11, ln. 11: after "types of" change "event" to --events--

Col. 13, ln. 6: after "manually" change "inputs" to --input--

Col. 13, ln. 58: after "object." change "Sometime" to --Sometimes--

Col. 18, ln. 16: after "only as" change "illustrated" to --Illustrative--

Col. 19, ln. 37: after "that do" change "no" to --not--

Col. 22, ln. 8: after "proxy server" change "to" to --do--

Col. 22, ln. 23: after "fixed amount" and before "with" insert --of time--

Signed and Sealed this

First Day of May, 2001

Attest:

NICHOLAS P. GODICI

Attesting Officer

Acting Director of the United States Patent and Trademark Office